United States Patent [19]

Wynstra et al.

[11] 4,206,095

[45] Jun. 3, 1980

[54] PROCESS FOR PRODUCING PARTICULATE RESOLES FROM AQUEOUS DISPERSION

[75] Inventors: John Wynstra, Somerville; Sidney J. Schultz, Cranford, both of N.J.

[73] Assignee: Union Carbide Corporation, New York, N.Y.

[21] Appl. No.: 971,960

[22] Filed: Dec. 21, 1978

Related U.S. Application Data

[63] Continuation of Ser. No. 776,881, Mar. 14, 1977, abandoned, which is a continuation-in-part of Ser. No. 672,075, Mar. 30, 1976, abandoned.

[51] Int. Cl.$^2$ ............................ C08L 1/28; C08L 5/00
[52] U.S. Cl. ...................................... 260/17.2; 260/14; 260/29.3; 260/29.4 R; 528/129; 528/137
[58] Field of Search ............................... 260/17.2, 29.3

[56] References Cited

U.S. PATENT DOCUMENTS

| | | | |
|---|---|---|---|
| 3,823,103 | 7/1974 | Harding | 260/17.2 |
| 3,870,670 | 3/1975 | Hofel | 260/29.3 |
| 3,875,089 | 4/1975 | Hofel | 260/14 |
| 3,943,080 | 3/1976 | Wismer et al. | 260/20 |
| 3,962,491 | 6/1976 | Sato et al. | 427/195 |
| 4,026,848 | 5/1977 | Harding et al. | 260/17.2 |
| 4,039,525 | 8/1977 | McCarthy | 260/17.2 |

FOREIGN PATENT DOCUMENTS

| | | |
|---|---|---|
| 516677 | 1/1931 | Fed. Rep. of Germany . |
| 1569332 | 9/1969 | Fed. Rep. of Germany . |
| 1347878 | 2/1974 | United Kingdom . |

OTHER PUBLICATIONS

C. A., vol. 83:60420k, Solid Resol Type Phenol Resins, Nishiyama et al.
C. A., vol. 83:194366f, Granular Phenolic Resins, Takiyama et al.

*Primary Examiner*—Edward M. Woodberry
*Attorney, Agent, or Firm*—Reynold J. Finnegan

[57] ABSTRACT

Particulate resoles are produced by reacting a phenol, formaldehyde, and an amine in an aqueous medium containing a protective colloid, to produce an aqueous suspension of a particulate resole, and recovering the particulate resole from said suspension.

35 Claims, No Drawings

PROCESS FOR PRODUCING PARTICULATE RESOLES FROM AQUEOUS DISPERSION

This application is a continuation of our prior U.S. application: Ser. No. 776,881 filed Mar. 14, 1977 and/which is a continuation-in-part of application 672,075 filed Mar. 30, 1976, both said prior applications now abandoned.

The invention relates to a process for producing particulate solid, heat-reactive, substantially water-insoluble resoles.

Introduction

Although solid, fusible, heat-reactive phenolic resole (one-step) resins have been produced by essentially the same process for more than a half century, the manufacture of these resins suffers from poor product control and poor batch-to-batch reproducibility.

To make a resole, phenol is reacted with a molar excess of formalin, using a base catalyst. Under alkaline conditions, phenol and formaldehyde condense to form methylols:

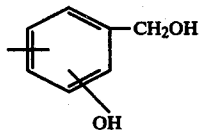

Further condensation results in the formation of methylene ethers and methylenes:

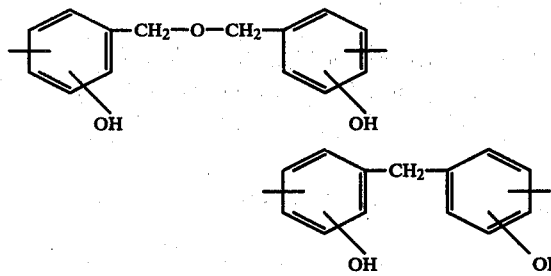

Because of the polyfunctionality of the ystem and because of the high formaldehyde to phenol mole ratio (typically 1.3 to 1.8), condensation to these latter structures cannot proceed very far before gelation will occur.

In the historical resole process, phenol, formalin and the base catalyst are held at 70° to 100° C. for a predetermined time to convert substantially all of the formaldehyde to methylol. Then the batch is dehydrated at a low temperature in a reduced pressure distillation step so that the 100% solids resin may be advanced at an elevated temperature to the desired degree of condensation. A hot plate gel time test (at 150° C.) is run on samples taken at regular intervals, and the time of arrival at a preselected endpoint is estimated. At this time the molten resin is discharged as rapidly as possible into water-jacketed resin coolers. It has been observed that the gel times of samples taken at the start of the discharge, at the midpoint, and at the end of the discharge differ considerably, since the hot resin in the still continues to advance before it can be completely discharged. The final resole resin is an amorphous brittle solid having a glass transition temperature not much above room temperature.

From this description of the historical resole process, it is apparent that the large scale batch production of solid resole resins involves a considerable amount of operator skill and art if either too "green" or gelled batches are to be avoided. On the other hand, two-step resins (novolaks) are incapable of gelation and, therefore, are much less critical to make. It is readily understandable that, wherever possible, two-step resins, plus hexa (i.e., hexamethylenetetramine) to provide cure, are preferentially employed commercially. There are certain applications, however, for which the characteristics of the one-step resins are preferred. One such application area is that of the pulverized resins where a two-step resin/hexa system is undesirable because of the volatility of hexa. A resole produced directly in particulate form might also be of interest in such applications areas for economic reasons; the grinding operation adds significant cost per pound of pulverized resins. Further economic incentive for providing an improved particulate resole resin process can be found in the lower cost of formaldehyde than that of phenol (as well as a lesser rate of recent increase), so that resoles currently have a raw material cost advantage over novolaks.

The Prior Art

The published literature has from time to time mentioned the production of powdered or particulate phenolic resins from dispersions, usually aqueous dispersions, by removal of the dispersing medium. For instance, there are casual references to the drying of aqueous suspensions or dispersions of phenolic resins to leave a dry, powdered residue. Dent et al., U.S. Pat. No. 2,069,178, is illustrative. Cheetham, in U.S. Pat. No. 1,976,433, discloses the joint precipitation of a phenolic resin and a filler to produce an intimate mixture of the resin and filler. A number of patents disclose the spray drying of aqueous phenolic resin mixtures to produce a dry, but usually water-soluble, phenolic resin. Illustrative are Dike, U.S. Pat. Nos. 2,186,369, Stephan, 2,675,336, and Spahr et al., 2,489,336. Wismer et al., in U.S. Pat. No. 3,850,868, disclose the production of inert phenolic resin beads by reacting phenol with from 1 to 3 moles of formaldehyde in an aqueous basic medium to form a prepolymer, blending the prepolymer with a protective colloid such as polyvinyl alcohol, fully polymerizing the prepolymer by acidifying and heating the mixture under agitation to form the inert beads, and removing the water. Kooguchi et al., in U.S. Pat. No. 3,743,619, describe the production of novolak powders by removing the water from an aqueous dispersion of a novolak. Spitzer, in Swiss Patent No. 153,843 (Chem. Abs. 1933, 27, 1113), proposed to precipitate plastic masses from colloidal solutions by the addition of a urea-formaldehyde hydrosol. Bresser, in British Plastics and Moulded Products Trader, August 1932, 4, 105, 112, reported the preparation of phenolic resin precipitates by dilution, "salting out", or acidification of an aqueous phenolic resin suspension containing a dispersing agent or protective colloid. (In this respect, Bresser cited D. R. P. 516, 677.)

In U.S. Pat. No. 1,807,545, Ostersetzer et al. disclose the production of powders by reacting a phenol and formaldehyde in an alkaline aqueous medium in the presence of a protective colloid such as gum arabic, followed by precipitating a powder from the reaction mixture. Example 2 of the patent, wherein the basic catalyst was a mixture of sodium hydroxide and ammonia, was followed as closely as possible. (This was made difficult by the lack of detail in the Example relating to endpoint and reaction cycle.) Using reaction conditions (15 minutes at 85° C.) so as to obtain a resin having applicant's typical 150° C. hotplate gel time endpoint (60 to 90 seconds), an emulsion of a liquid phenolic resin was made that passed through a filter. In a repeat experiment using a longer reflux time (1.5 hours at 100° C.), a filterable but gelled product was produced which nevertheless sintered on storage.

Other prior art discloses the preparation of aqueous phenolic resin dispersions utilizing various interfacial agents. (This art does not teach the isolation of the dispersed reactive resin by removing the water.) Illustrations include Harding, U.S. Pat. Nos. 3,823,103, Ingram, 3,666,694, and Anderson et al., 3,862,060.

SUMMARY OF THE INVENTION

The present invention provides a process for the production of particulate solid, heat-reactive, substantially water-insoluble resoles. The process comprises the steps of:

(a) reacting formaldehyde, a phenol, and hexamethylenetetramine or a compound containing amino hydrogen, in an aqueous medium containing an effective amount of a protective colloid, for a period of time and at a temperature sufficient to produce an aqueous dispersion of a particulate solid, heat reactive, substantially water-insoluble thermosetting resole; and (b) recovering the particulate resole from said aqueous dispersion.

Definitions

The following definitions apply in this invention:
Particulate solid—This term refers to a finely divided solid having a maximum particle size of the order of 500 microns. Preferably, the particle size will average about 5 to 20 microns. By "solid", is meant a resin having a softening point (glass transition temperature) above about 30° C., and preferably above about 40° C.
Heat-reactive—This refers to a phenolic resin that is capable of polymerization at a usefully practical rate when subjected to elevated temperatures, e.g., temperatures above about 100° C. Ordinarily, such resins will advance slowly, but measurably, even at lower temperatures.
Phenolic resin—a condensation product of a phenol and an aldehyde, usually formaldehyde.
Resole—a phenolic resin produced using at least equimolar amounts, and usually more, of aldehyde. Base catalysts are ordinarily used in making resoles. As used in the art, "resole" refers to phenolic resins that contain useful reactivity, as opposed to the fully polymerized or cured resins.
Substantially water-insoluble—This refers to a phenolic resin that, while it may very well contain a finite proportion of water-soluble components (such as unreacted phenol or mononuclear methylol phenols), is capable of existing as a separate phase in an aqueous medium.
Protective colloid—A composition that is capable of promoting the production of, or of maintaining, a phenolic resin-in-water dispersion wherein the phenolic resin is the dispersed phase and the aqueous medium is the dispersing or continuous phase.
Aqueous dispersion—As used herein, an aqueous dispersion is a dispersion wherein the dispersing or continuous phase is composed primarily of water, although some organic material will be dissolved in the aqueous phase and some water will be contained in the dispersed resin phase.
Amino hydrogen—Refers to a hydrogen atom bonded directly to an amino nitrogen (including ammonia). As used herein, the term excludes amido hydrogens wherein the nitrogen is alpha to a carbonyl group.

DESCRIPTION OF THE INVENTION

In the first step of the process of the invention, formaldehyde is reacted with a phenol and hexamethylenetetramine or a compound containing at least one amino hydrogen, in an aqueous medium in the presence of a protective colloid. The formaldehyde is most conveniently and economically employed in the form of the aqueous solution known as "formalin", although other forms, such as paraform, can be used.

The process also uses a trifunctional phenol, such as phenol (monohydroxybenzene), m-cresol or resorcinol, or a tetrafunctional phenol, such as, 2,2-bis(4-hydroxyphenyl)-propane ("bisphenol-A"), and mixtures thereof. Para-substituted phenols such as p-cresol, p-chlorophenol, and p-t-butylphenol, can also be used, but only as a fraction of the phenol part of the formulation. When p-t-butylphenol was used with phenol in amounts of at least about 50 mole percent or more of the phenol component, a non-thermosetting product was produced. The reason for this failure to produce a thermosetting product is not known; it can only be postulated that the p-alkylphenols lack sufficient reactivity toward formaldehyde under the conditions of the process of this invention. Compared to the conventional resole process (in the melt, at 100° C. or higher, and at a pH of 8), our conditions are quite mild (in the presence of 30% by weight of more water with 30 to 50% being preferable, at 85° C. or even lower, at a pH of about 7). In fact, theoretically, even a p-alkylphenol/formaldehyde/ammonia (or hexa) formulation should yield a thermosetting product because of the polyfunctionality contributed by the ammonia. Routine experimentation will suffice to determine the maximum proportions of difunctional phenol that can be used in particular cases, while still producing a thermosetting produce.

The third reactant is hexa or a compound that contains at least one amino hydrogen. Specific illustrative examples include ammonia, hexa (the two are complete equivalents in this invention), and aliphatic amines such as methylamine, dimethylamine, ethylene diamine, and monoethanolamine. Ammonia and hexa are preferred. The other amines mentioned act as plasticizers and yield products that tend to sinter. When used, they will usually be employed in minor amounts in combination with ammonia and/or hexa as a means for increasing flow.

The reactants are employed in proportions such that the resulting resole is a thermosetting composition. The maximum utilizable proportion of methylene is 0.5 methylene per ring hydrogen in the phenol that is reactive with formaldehyde. (One equivalent of methylene is provided by each mole of formaldehyde, and six equivalents of methylene are provided by each mole of hexa. The reactive ring hydrogens are those that are ortho and para to the phenolic hydroxyl.) The operative proportions of the reactions are much broader, however, and actually cannot be stated with much precision. For instance, a large excess of methylene can be present in the reaction mixture, but the excess will either be extracted (as free formaldehyde) during subsequent washing of the resole, or it will be lost during cure. Resoles containing excess formaldehyde will also have an increased tendency to sinter. If insufficient methylenes are present in the reaction mixture, a thermosetting product can still be produced, but part of the phenol will remain unreacted. Much of the free phenol can be extracted from the product by washing, but it would have to be recycled to avoid waste. In almost all cases, the reaction mixture will contain from about 0.25 to about 1 methylenes per reactive hydrogen in the phenol. As a guide, when phenol (monohydroxybenzene) is used, preferred proportions will be from about 1.25 to about 1.75 equivalents of methylene per mole of phenol.

As a general rule, the amine compound is used in an amount sufficient to impart a substantially hydrophobic character to the resole. As will be discussed more fully below in the experimental section, most of the amino compound reactant is apparently incorporated in the product in the form of a benzylamine, a certain minimum proportion of which appears to be required in order to impart the desired substantially water-insoluble property to the product. This minimum proportion will vary somewhat, depending on such factors as nature of reactants and proportion of methylene to phenol. When hexa is used with phenol, the minimum is about 6 parts of hexa per 100 parts, by weight, of phenol. When 5 parts of hexa were used in a similar formulation, the resole coalesced during filtering. When hexa is used with bisphenol-A, a minimum of about 3 parts of hexa per 100 parts of bisphenol-A should be used. A convenient way to determine the approximate minimum proportion needed in particular cases, is to vary the proportion of amine compound in a series of batches to determine at what point the product becomes sufficiently hydrophobic to be readily separable from the aqueous phase by filtration. Those products that are insufficiently hydrophobic will coalesce to an unfilterable mass (in extreme cases), or, in borderline cases, will excessively agglomerate during filtration or drying. (This test is valid to give the approximate minimum of amine needed, even though a means other than filtration, e.g., centrifugation, is used in separating the aqueous phase from the particulate resole. Slightly more hexa might be needed when centrifugation is used because filtering is usually a gentler treatment.)

There is also a maximum amount of amine compound that should be used. Above a certain proportion of amine compound, a rapid initial reaction is obtained, but the reaction product cannot be advanced beyond a certain point, as is evidenced by failure to obtain gelation on the 150° C. hotplate after 5 minutes or more. (From one to one and one-half minutes is the usual 150° C. gel time target.) In particular cases the precise maximum will have to be determined by routine experimentation. When hexa is the amine compound, at least one mole of free formaldehyde (as distinguished from the methylenes provided by hexa) should be provided per equivalent of amino nitrogen. When ammonia is used, at least 2½ moles of free formaldehyde should be used per mole of ammonia.

The amount of amine compound that should be used will be termed herein as an "effective amount", which is defined as being above the minimum and below the maximum proportions described above.

The process of the invention also uses a protective colloid. Materials that have been found to be operative as protective colloids include gum arabic, gum ghatti, hydroxyalkyl guar gum (e.g., the ethylene oxide or propylene oxide adducts of guar gum having a minimum degree of hydroxyalkylation of about 5 weight percent), partially hydrolyzed polyvinyl alcohol, hydroxyethyl cellulose, carboxymethyl cellulose, soluble starch, and agar. Gum arabic, gum ghatti, hydroxypropyl guar gum, and partially hydrolyzed polyvinyl alcohol have given the best results. The commercially available polyvinyl alcohols that gave the best results were those having a molecular weight of the order of 10,000 and a degree of hydrolysis of about 88 percent (remainder of the units in the polymeric chain being vinyl acetate units). Higher molecular weight versions of partially hydrolyzed polyvinyl alcohol (about 96,000 and about 125,000 m.w.) yielded coarser particle size dispersions, and in one instance, a dispersion too poor to permit isolation of a particulate solid (the resin coalesced). Lower molecular weight versions (about 3000 m.w.) of 88 percent hydrolyzed polyvinyl alcohol, and a 99 percent hydrolyzed 10,000 molecular weight, version of polyvinyl alcohol, were unsatisfactory in that the reaction mixtures utilizing them coalesced upon cooling.

The protective colloid is used in an effective amount, that is, in an amount sufficient to promote the formation of and/or stabilize a phenolic resin-in-water dispersion. It is sufficient that the dispersion be stable while the reaction mixture is being agitated to the degree ordinarily associated with the production of phenolic resins. It is desirable for the dispersion to settle on standing within a reasonable time (e.g., within a few minutes), in order to facilitate separation of the particulate resin phase from the aqueous phase. Of course, when the resin phase settles, it should not coalesce to a non-particulate mass. This capability is a function of both the substantial water-insolubility of the resin and the protective colloid.

It is desirable to use the protective colloid in a minimum effective amount, because when excessive amounts are used the dispersion may take an impractically long time to settle on standing. While the precise proportions needed may vary somewhat from one case to another, and can be determined by routine experimentations, a minimum effective amount will normally be from about 0.1 to about 0.5 weight percent, based on weight of phenol. It is rare that the protective colloid will be used in amounts of more than about 2 weight percent, based on weight of phenol. A preferred proportion is about 1 weight percent, based on weight of phenol.

The reaction is carried out in an aqueous medium. The minimum amount of water that should be used is that proportion which will permit the formation of a phenolic resin-in-water dispersion. While the minimum amount of water needed will vary somewhat from one formulation to another, as a rule at least about 50 parts by weight of water should be provided per 100 parts by weight of phenolic resin. (The weight of phenolic resin is equal to the weight of phenol, formaldehyde, and amine charged to the reaction, minus the amount lost as water of condensation.) A moderate excess over the minimum amount of water is recommended. There is no advantage to using a large excess (in fact, it is undesirable because reactor productivity will be reduced), although the process will be operable with a large excess of water.

The reaction of step (a) can be carried out by charging all the components to a conventional reaction vessel (such as the type that has been used for 50+years in making phenolic resins), and heating the reaction mixture, while agitating, to an elevated temperature. It is probably preferable to charge the protective colloid at the beginning of the reaction, although it could be added later during step (a), if desired, up to the point that molecular weight buildup to water insoluble products occurred, as evidenced by clouding of the reaction mixture. A reaction temperature of about 80°–85° C. has been found to be convenient, although a temperature of from about 70° to about 100° C. could be used in some cases. At lower temperatures, below, for example, about 55° C., the reaction becomes impracticably slow. At temperatures much above about 90° C., it may be too difficult to control the reaction in large scale batch equipment. A few minutes after reaching reaction temperature, the mixture will become cloudy. The progress of the condensation reaction can be followed by periodically withdrawing samples and testing the samples for the 150° C. hotplate gel time (a procedure known to all phenolic resin chemists). The desired gel time may vary, but it will usually be reached in about 60 to 90 minutes at 80°–85° C. The temperature can be maintained during the reaction by standard heating or cooling means, as required. In commercial size batches, vacuum reflux is a convenient way to maintain the desired temperature.

When the desired gel time has been reached, the mixture is cooled to below about 40° C. to quench the reaction.

In step (b) of the process, the particulate solid resole is recovered from the aqueous dispersion product of step (a). The dispersion can be diluted with more water, cooled to 20° to 30° C., and filtered to produce a wet filter cake. (In commercial scale operation, centrifugation may be preferable to filtration.) The filter cake can then be washed with pure water (at 20° C. to 30° C.,) filtered again, and then dried. During the final drying step, gentle agitation is desirable in order to deter agglomeration of the particles. Fluidized bed drying has been found to be an excellent way to effect the final drying step.

The resulting particulate resole is often a free-flowing powder that has excellent resistance to sintering. The powder can be used for the classical phenolic resin applications such as fiber bonding, molding, adhesives, and the like.

EXAMPLE 1

This Example illustrates a general procedure for carrying out the process of the invention, and the effect of varying the reaction time in step (a).

A "standard formulation" was employed for many of the experiments reported herein. (The formulation was selected for convenience, and is not necessarily an optimized formulation for any particular end-use application.) The components of the reaction mixture are shown in Table I.

TABLE I

| Component | Parts By Weight | Grams for a 3-liter batch | Moles per mole phenol |
|---|---|---|---|
| Phenol | 100 | 700 | 1 |
| 40% aqueous formaldehyde | 90 | 630 | 1.13 |
| Water | 146 | 1020 | |
| Hexa | 9 | 63 | 0.06 |
| Protective colloid | 1 | 7 | |

The formulation contained 1.49 equivalents of methylene per mole of phenol and 0.24 equivalents of amino nitrogen per mole of phenol.

The experimental procedure is the following (using gum arabic as the protective colloid):

The phenol, formalin and water were weighed directly into a 3-liter flask which was equipped with a motor-driven paddle stirrer, a thermometer, and a reflux condenser. After adding the hexa and gum arabic (both as dry powders), the batch was heated cautiously to 85° C.; this required about 45 minutes. Within less than one minute at 85° C., the originally clear solution suddenly became very opaque; from this point on the batch had the appearance of a dispersion. At this 3-liter scale the condensation was exothermic enough that some external cooling was required for about 40 minutes to keep the temperature from rising above 85° C.; at a 1-liter scale the same reaction appeared to be much less exothermic. Sixty minutes after the cloud point, a 400-ML sample was removed from the batch without interrupting the agitation; it was cooled to about 40° C. and then poured into 1200 ML of tap water at room temperature stirred with a magnetic bar. Four more 400-ML samples were taken at 75, 90, 120, and 150 minutes, and the reaction again quenched by cooling and diluting.

In the subsequent work-up, each of the diluted samples was stirred for a few minutes and then allowed to settle. With gum arabic as the interfacial agent, settling was surprisingly rapid. The supernatant liquid was decanted and discarded (after filtering off a small amount of non-settled solid to keep the experiment as quantitative as practical). The solid left behind was washed with another 1200 ML of tap water at room temperature. After a second and a third decantation and a fourth wash, the solid was filtered off and the wet solid spread out to dry. In this experiment and others like it, a small amount of sintering occurred during the room temperature (about 30° C.) drying. It was found that turning over the wet powder during the first hour or two of drying helped to minimize sintering. In the experiment being described here, it was noted that the first sample (100-sec Gel Time) filtered somewhat more slowly than the others and sintered a bit more. After removing the last sample (which analysis later showed to be completely gelled), the flask was cleaned by flushing with cold water; the glassware was essentially clean except for a very small amount of resin film on the agitator shaft.

As anticipated, the last sample was insoluble and infusible. The fourth sample was barely fusible at 150° C. (gelling quickly) and merely swelled in solvents. The other 3 samples were completely soluble and fusible. Table II summarizes the properties of these products along with the same properties measured on commercial one-step resins selected as reference materials. It was concluded that the three fusible particulate solids bracketted the useful one-step resin range.

A comment should be made about the plate flow data of Table II. In the usual plate flow test, 0.5 g of powdered resin is pressed to a pill. In the case of the experimental products these did not sinter sufficiently to make a coherent pill; it was necessary to increase the pressure (by increasing the pill weight to 0.8 g) to do so. This was interpreted to be an indication of the protective action of gum arabic. Making a coherent pill from gum ghatti-based resins was even more of a problem. In the plate flow test, the pressed pill is placed on a glass plate, which is then placed in a horizontal position in a 125° C. oven. After 3 minutes, the plate is tilted down 45° from the horizontal. The length the resin flows before gelling is then measured. Plate flow in phenolic resins is a function of degree of cure and the presence or absence of plasticizing agents such as water and free phenol. The plate flow test measures gravity induced flow. It is not unusual for a phenolic resin to have zero plate flow, but at the same time, for the same resin to have sufficient flow to be useful in end-use applications wherein the resin is subjected to heat and pressure during cure.

TABLE II

CHARACTERIZATION OF ONE-STEP RESINS 90-FACTOR/9-PART HEXA

| Sample No. | 85° C. Reaction | % N[b] | Gel Time At 150° C. | 125° C. Plate Flow | | Free Phenol | GPC ANALYSIS | | |
|---|---|---|---|---|---|---|---|---|---|
| | | | | | | | $A_n$ | $A_w$ | $A_w/A_n$ |
| 1 | 60 min. | 2.41 | 102 sec. | 111, | 100mm | 10.4% | 41.0 | 85.7 | 2.09 |
| 2 | 75 | 2.34 | 70 | 53, | 58 | 9.9 | 44.2 | 100.3 | 2.26 |
| 3 | 90 | 2.31 | 42 | 31, | 28 | 8.5 | 45.1 | 104.1 | 2.30 |
| 4 | 120 | 2.34 | Only slightly fusible; merely swells in solvent | | | | | | |
| 5 | 150 | 2,28 | Completely infusible, insoluble | | | | | | |
| Resole A[a] | — | | 45 | 34, | 34 | 2.6 | 54.3 | 120.3 | 2.21 |
| Resole B[a] | — | | 63 | 85, | 91 | 9.3 | 43.1 | 91.9 | 2.13 |

NOTES:
[a] Recent commercial batches of Resole A (Ba(OH)$_2$/hexa resole) and of Resole B (hexa-catalyzed resole) chosen as reference materials.
[b] Calculated from hexa charge: 2.46 % N.
[c] $A_n$ = number average molecular length; $A_w$ = weight average molecular length; $A_w/A_n$ = dispersity, a measure of molecular weight distribution. For phenolic resins, the corresponding molecular weight figures are about 10 times the GPC values.

The particle size of the powder did not appear to be related to the degree of advancement of the resin. Each of the three soluble products of the rate-of-advancement experiment described above was a coarse powder containing minor amounts of two types of sintered material. A very minor fraction consisted of fused resin "nuggets" which were shown to be the result of inadequate agitation. The use of a Morton (creased) flask almost eliminated the nuggets. The larger amount of sintered material, apparently agglomerates, developed during drying and were easily crushed. The use of a fluidized bed dryer has virtually eliminated agglomeration during the drying step.

In the water-washing step of the experiments reported here, after reaching the gel time endpoint, the dispersion, originally at about 40% percent solids, was diluted with about 3 times its volume of water at 20°–30° C., to quench the condensation and also to make decantation or filtration easier. The first wash was followed by three more washes of the same volume. These washes add up to a considerable volume which would become of concern in any scale-up of the process. Further work has shown that one, or at most two, washes using one volume (instead of three) of additional water per wash, is probably sufficient in almost all cases to remove the lower molecular weight, water-soluble organic materials that promote sintering in the final product. The water from the first wash can be concentrated and recycled to the reaction in order to lessen the loss of raw materials.

In the standard formulation, it is beneficial to cool the dispersion to a temperature below about 30° C. before filtering. This facilitates filtering, apparently by cooling the resin particles below the temperature at which they tend to agglomerate. Little advantage is gained by cooling below 20° C. The temperature below which filtering is facilitated may very well differ somewhat from one formulation to another, but it can readily be determined by routine experimentation. Unless otherwise stated, the filtering step in the experiments reported below was carried out at about 25° C.

EXAMPLE 2

Samples of particulate resole made by the formulation and procedure of Example 1 were evaluated in a particle board molding formulation. The results are shown below in Table III, with a commercial pulverized phenolic resin shown for comparison. The commercial resin was a one-step, two-step resin mixture. To the best of applicants' knowledge, there are no pulverized pure resole phenolic resins that are commercially available.

DEMONSTRATION OF THE UTILITY OF PARTICULATE RESOLE

| THE MIX, parts by weight | A | B | C | D |
|---|---|---|---|---|
| Commercial Resin | 2 | 4 | — | — |
| Particulate Resole | — | — | 2 | 4 |
| Coarse Wood Flour | 106 | 106 | 106 | 106 |

| RESULTS | A | B | C | D |
|---|---|---|---|---|
| Torsion Sheer (psi) | | | | |
| 6 Min. Cure | 185 ± 26 | 300 ± 32 | 182 ± 22 | 255 ± 25 |
| 10 Min. Cure | 217 ± 13 | 337 ± 28 | 208 ± 12 | 287 ± 17 |
| Dry Flex. Str. (psi) | | | | |
| 2.5 Min. Cure | 2529 ± 273 | 4620 ± 446 | 3690 ± 190 | 4782 ± 513 |
| 5 Min. Cure | 3945 ± 388 | 5726 ± 386 | 3724 ± 284 | 4800 ± 352 |
| Wet Flex. Str. (psi) | | | | |
| 2.5 Min. Cure | 543 ± 123 | 1533 ± 158 | 648 ± 354 | 1278 ± 432 |
| 5 Min. Cure | 950 ± 158 | 1650 ± 734 | 802 ± 126 | 1598 ± 218 |

All cures were at approximately 165° C. for the lengths of time noted. Wet flexural strength data were obtained after a 16-hour soak.

EXAMPLE 3

In this experiment, the following procedure was employed using the standard formulation: All of the reactants were weighted directly into a creased (Morton) flask; the order of addition is not considered to be critical. The flask was equipped with a motor-driven stirrer, a reflux condenser and a thermometer. The batch was heated to 85° C. and held at this temperature by cooling or heating as required. (In a 35-gallon still run the desired 85°±1° C. temperature was held easily by vacuum-reflux.) Very soon after reaching 85° C. the batch, originally a clear solution, clouded as the condensate reached the water-insoluble stage. After about 30 minutes beyond the could point, the degree of resin advancement was ascertained by measuring the gel time on a 150° C. steam hot plate; in the work reported here a 75-second gel time was the target.

At the extrapolated time, the condensation reaction was quenched by cooling the flask contents with a cold water bath; in the pilot plant run noted above, vacuum reflux cooling was very effective. After cooling to about 30° C., the batch was poured into 500 parts by weight of cold water contained in a beaker and stirred with a magnetic stirring bar. After stirring 10 minutes, the slurry was filtered through coarse paper (Whatman No. 1) in a large Buchner funnel with the aid of modest suction. When the application of full house vacuum failed to wring any more water from the filter, the wet filter cake was coarse-ground by pushing it through an 18-mesh screen, dried with air in a Pfaltz and Bauer fluidized bed drier at ambient temperature for 30 minutes (one-liter batch size; 1 hour for a two-liter batch) and the dry powder passed through a 25-mesh screen to break up any agglomerates that might be present. Excellent results were later obtained by fluidized bed drying for 30 minutes at 60° C. This drying cycle invariably reduced the water content of the powder to less than 1 percent, and usually to less than 0.5 percent. When drying at elevated temperature, the powder should be cooled before being discharged from the fluidized bed, in order to avoid sintering.

Some 22 materials were substituted for the gum arabic of the standard formula, each at the 2 parts level. It was easy to differentiate the protective colloids from the materials that did not exhibit protective colloid properties. The latter resulted in gross separation into a fluid aqueous phase and a viscous resin phase as the condensation proceeded beyond the cloud point. The protective colloids, on the other hand, gave fine particle size dispersions (the whiteness of which gave some clue to the particle size) which could be filtered and dried.

Three gum arabic substitutes, gum ghatti, ELVANOL 51-05 and JAGUAR HP-1, gave small particle size, very free-flowing powders which were at least the equivalent of gum arabic-based products. The appearance, plate flow and reactivity of these products is summarized in Table IV. The resoles based on gum ghatti and JAGUAR HP-1 fused and were reactive at elevated temperatures but showed no (gravity induced) plate flow. That this lack of flow was due to more than fine particle size was suggested by the finding of some flow at essentially the same particle size with ELVANOL 51-05 as the colloid.

Four other materials (hydroxyethyl cellulose, carboxymethyl cellulose, soluble starch, and agar) did not show the very fine particle size and free-flowing character of the products of Table IV, but gave an adequate dispersion and good filterability, but the products tended to be lacking in sinter resistance. With some further work, optimized formulas might be found for these materials. Our results are summarized in Table V.

Table VI lists the other 15 materials which showed no protective colloid properties at the 2 parts level.

TABLE IV

PROTECTIVE COLLOIDS SHOWING EXCELLENT PERFORMANCE IN PARTICULATE RESOLE PREPARATION[a]

| Sample | Protective Colloid[b] | Gel Time | Plate Flow | Other Observations |
|---|---|---|---|---|
| 1 | Gum Arabic (1 Part) | 77 sec. | 40 min. | Range of particle sizes, very free-flowing |
| 2 | Gum Ghatti (1 Part) | 79 | 0 | Small particle sizes, very free-flowing |
| 3 | ELVANOL 51-05 | 78 | 44 | Small particle size, very free-flowing |
| 4 | JAGUAR HP-1 | 80 | 0 | Small particle size, very free-flowing |

NOTES:
[a]Standard formulation and process. Protective colloids at 2 parts per 100 phenol (by weight), except as indicated.
[b]Identity of materials:
Gum Arabic - Polysaccharide of natural origin, imported from Africa.
Gum Ghatti - Polysaccharide of natural origin, imported from India.
ELVANOL 51-05 Polyvinyl alcohol, 88% hydrolized, low molecular weight (about 10,000)
JAGUAR HP-1 Hydroxypropylated guar gum containing about 15 weight percent propylene oxide units.

TABLE V

PROTECTIVE COLLOIDS SHOWING PROMISE IN PARTICULATE RESOLES

| Sample | Protective Colloid[a] | Gel Time[b] | Plate Flow[b] | Other Observations |
|---|---|---|---|---|
| 5 | Cellosize WP-09 | 77 sec. | 73 min. | The best results of this group |
| 6 | CMC | — | — | Sintered on standing overnight |
| 7 | Soluble Starch | — | — | Sintered overnight |
| 8 | Agar | — | — | Sintered overnight |

NOTES:
[a]Identity of protective colloids:
CELLOSIZE WP-09 - low molecular weight hydroxyethyl cellulose (UCC).
CMC - carboxymethyl cellulose (Hercules).
Soluble Starch - (Merck reagent grade).
Agar - polysaccharide derived from seaweed (MC&B).
[b]All four products handled well during the condensation, on cooling and diluting, and during filtration and drying. On standing, however, all sintered, #5 slowly over a period of several weeks and #6, 7 and 8 on standing overnight.

TABLE VI

MATERIALS SHOWING NO ACTIVITY AS PROTECTIVE COLLOIDS IN STANDARD PARTICULATE RESOLE FORMULA

| Sample | Material | |
|---|---|---|
| 9 | EEA-9500, NH$_4^+$ salt | Ammonium salt of ethylene/acrylic acid copolymer |
| 10 | POLYOX N-10 | Poly(ethylene oxide), 100,000 MW |
| 11 | CARBOWAX 6000 | Poly(ethylene oxide), 6,000 MW |
| 12 | JAGUAR | Guar gum, saccharide of domestic origin |
| 13 | Casein | Protein |
| 14 | Gelatin | Protein |
| 15 | PVP | Polyvinyl pyrrolidone |
| 16 | ACRYSOL | Polyacrylic acid, Na salt |
| 17 | CYANAMER P-250 | Polyacrylamide |
| 18 | L-77 | Silicone fluid |
| 19 | L-540 | Silicone surfactant |
| 20 | L-5340 | Silicone surfactant |
| 21 | TERGITOL NP-44 | Nonionic surfactant |
| 22 | EAA-9500, Na$^+$ salt | Sodium salt of ethylene/ |

TABLE VI-continued
MATERIALS SHOWING NO ACTIVITY AS PROTECTIVE COLLOIDS IN STANDARD PARTICULATE RESOLE FORMULA

| Sample | Material | |
|---|---|---|
| 23 | ELVANOL 50-42 | acrylic acid copolymer Polyvinyl alcohol, 88 percent hydrolized, high molecular weight (about 96,000) |

None of these experiments yielded a filterable product.

Elvanol 51-05 is no longer available commercially. GELVATOL 20-30 (Monsanto)* and VINOL 205 (Airco)* are commercially available, partially hydrolyzed polyvinyl alcohols that work equally well in the process. About 1 part per hundred of phenol of these materials is recommended.

* GELVATOL 20-30 and VINOL 205 are 88 percent hydrolyzed polyvinyl alcohols having molecular weights of about 10,000.

EXAMPLE 4

Using the procedure of Example 3, several nitrogen compounds were evaluated as substitutes for hexa in the formulation:

100 Parts—Phenol
120 Parts—40% Formalin
(0.257 Equiv.)—Nitrogen Compound
1.0 Part—Gum Arabic
(To 50% Conc.)—Water The results of this study are summarized in Table VII.

TABLE VII
HEXA REPLACEMENTS IN PARTICULATE RESOLES

| Sample | N-Compound | Parts | Results |
|---|---|---|---|
| 1 | 29% Aq. $NH_3$ | 15.0 | Equivalent to hexa in all respects. |
| 2 | 40% $CH_3NH_2$ | 19.9 | Filterable but sintered on storage; has high gel time, long flow. |
| 3 | 40% $(CH_3)_2NH$ | 28.8 | Filterable but sintered on storage; high gel time, long flow. Nitrogen found: 2.59%, calc'd: 2.77%. |
| 4 | Ethylene Diamine | 7.7 | Filtered with difficulty; sintered readily; has long flow, normal gel. |
| 5 | Monoethanolamine | 23.5 | Filtered with great difficulty; sintered very quickly. |
| 6 | Urea | 7.7 | Failed to yield a water-insoluble condensate after 2 hours/100° C. |
| 7 | p-Phenylene Diamine | 13.9 | Failed to advance to the water insoluble state. |
| 8 | Diethylene Triamine | 8.7 | Filtered with difficulty, coalesced to a sticky mass. |
| 9 | Melamine | 10.8 | Still water-soluble after 1.5 hours/reflux. |
| 10 | Guanidine Carbonate | 10.4 | No apparent reaction. |
| 11 | Dicyandiamide | 7.2 | Heat-reactive but not filterable. |
| 12 | Ammonium carbonate-hydrate | 14.6 | Liberated $CO_2$ and gave a normal Particulate Resole. |
| 13 | Ammonium Acetate | 19.8 | Liberated at least some acetic acid; Product was not filterable. |
| 14 | 64% Aqueous Hydrazine | 6.4 | Slow reaction to an apparent thermoset product. |

Some of the lower alkylamines—especially methylamine and dimethylamine—were surprisingly effective in promoting filterability in spite of their effect in reducing the functionality of the condensation system. NMR analysis indicated that nitrogen was predominantly in the form of a benzyl tertiary amine. As a class, the alkylamines showed the plasticizing effect of the alkyl groups in a tendency to sinter on storage and, in extreme cases, in fusion during isolation. The use of a polyamine did not correct this nor did an arylamine. Neither urea nor melamine proved to be a useful modifier but, rather, appeared to foster water solubility. Only water-soluble products were made when urea/formalin/hexa/gum arabic or melamine/formalin/hexa/gum arabic systems were condensed in aqueous media. The finding that substitution of ammonia $$NH_3$$

with any organic groups detracted from performance suggested that only the other nitrogen hydride, hydrazine, $$H_2N-NH_2$$

might function as a hardening modifier. At the concentration noted above, however, a phenol/formalin/hydrazine reaction produced a water-insoluble product, but it could not be brought to a thermosetting stage in a reasonable time.

Both methylamine and dimethylamine produced a very fast initial reaction—as judged by the exotherm and by testing for hotplate gel time—but the isolated product in each case had a longer gel time and a longer flow than expected on the basis of standard particulate resole experience. This behavior was explained as a consequence of the lower functionality of these amines compared to ammonia. This reasoning prompted the consideration of ammonia/dimethylamine (or hexa/dimethylamine) blends as a route to increasing flow. Some encouragement was found for this idea, but increased flow was invariably accompanied by lessened sinter resistance.

EXAMPLE 5

GPC analysis data indicated that the particulate resoles are fully comparable to conventional resoles in molecular weight, in spite of the very mild conditions of the process - about an hour at 85° C., diluted with at least an equal volume of water, and at a pH of about 7. Samples of particulate resoles and of a general purpose conventional resole containing 6 parts hexa were submitted for NMR analysis. The analyses, summarized in Table VIII, show that the particulate resoles have high tribenzylamine and methylene bridge contents and somewhat lower methylol and methylene ether contents. It was concluded that the subtle differences in composition between the conventional resole and the standard (9-part hexa) particulate resole must be at least partially responsible for the difference in sinter resistance.

chosen as the end point. The recovery of the solid product proceeded exceptionally well. The product was not further characterized than noted in Table X.

TABLE VIII

METHYLENE DISTRIBUTION IN RESOLES; SUMMARY OF NMR ANALYSIS

| | METHYLENE PER HUNDRED MOLES PHENOL | | | |
|---|---|---|---|---|
| | Conventional Resole | Particulate Resoles of Invention | | |
| STRUCTURE | (6 HEXA) | (6 HEXA) | (9 HEXA) | (METHYLAMINE) |
| Methylol | 38 | 30 | 37 | 28 |
| Hemi-formal | 0 | 5 | 3 | 10 |
| Methylene Ether | 10 | 6 | 9 | 2 |
| Methylene Bridge | 35 | 47 | 39 | 48 |
| Tert-Benzylamine | 40 | 41 | 51 | 59 |
| Sec-Benzylamine | 3 | 4 | 0 | 3 |
| Oxazine | 1 | 4 | 11 | 0 |
| | 127 | 137 | 150 | 150 |

RESOLES STUDIED:

Conventional resole, containing 6 parts hexa and a formaldehyde factor yielding 1.27 methylene/phenol; Particulate Resole based on "standard" formula; hexa reduced to 6 parts; and $CH_3NH_2$ for $NH_3$ of standard.

STRUCTURES:

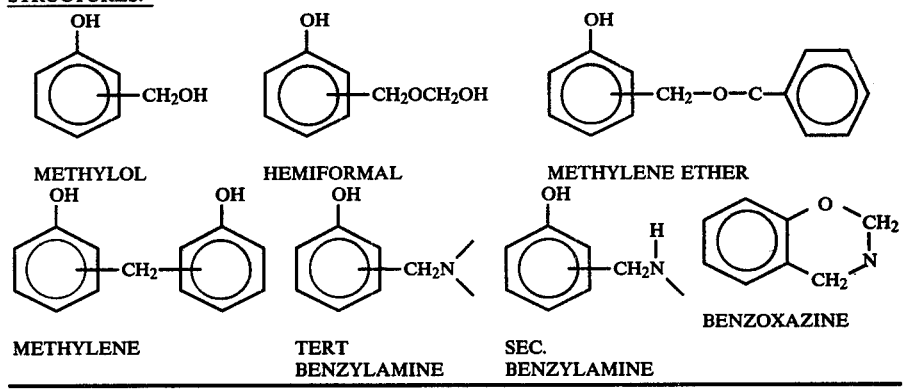

EXAMPLE 6

Using the procedure of Example 1, a series of particulate resoles were made with different formaldehyde proportions. The proportion of reactants, and yields, gel times and plate flows of the products are shown in Table IX:

TABLE IX
THE EFFECT OF FORMALIN FACTOR

| Sample | FORM[a] FACT. | FORMULA WEIGHTS USED[b] | | | | | PRODUCT YIELD | 150° C. GEL | 125° C. PLATE FLOW |
|---|---|---|---|---|---|---|---|---|---|
| | | PHENOL | 40% $CH_2O$ | HEXA | $H_2O$ | G.A.[d] | | | |
| 1 | 70 | 200 | 140 | 18 | 292 | 2.0 | 220 | 89 | 100 |
| 2 | 90 | 200 | 180 | 18 | 292 | 2.0 | 222 | 81 | 74 |
| 3 | 110 | 200 | 220 | 18 | 292 | 2.0 | 225 | 72 | 62 |
| 4 | 120 | 200 | 240 | 24 | 292 | 2.0 | 240 | 78 | 49 |
| 5[c] | 110 | 200 | 220 | 18 | 292 | 2.0 | 230 | 65 | — |
| 6[c] | 110 | 200 | 220 | 18 | (c) | 2.0 | 254 | 58 | — |

NOTES:
[a]Formaldehyde factor, parts of 40% $CH_2O$ per 100 parts phenol.
[b]All reactions carried out in one-liter flasks.
[c]In this pair of experiments the first wash (2470 grams) of Exp. 5 was concentrated to 330 grams by boiling off water. The concentrate was substituted for make-up water of Exp. 6.
[d]Gum arabic.

EXAMPLE 7

The formulation of Table X was used to produce an example of a bisphenol-A one-step resin in particulate form. The procedure used was analogous to that described in earlier Examples. As in the case of phenol, reaction was at 85° C. and a 70-second gel time was

TABLE X
BISPHENOL-A ONE STEP RESIN

FORMULA
| | |
|---|---|
| 200 GRAMS | Bisphenol A |
| 160 | 40% Formalin |
| 16 | Hexa |
| 320 | Water |
| 2.0 | Gum Arabic |

CHARACTERIZATION

| | |
|---|---|
| 78 sec. | Gel Time (150° C.) |

TABLE X-continued
BISPHENOL-A ONE STEP RESIN

| ?ᵃMM. | Plate Flow (125° C.) |
|---|---|

NOTE:
ᵃ·The plate flow value could not be determined because the sample did not adhere to the glass plate but slid off. The product, however, did flow at 125° C.

EXAMPLE 8

Particle Size Distribution

The particle size distribution of several particulate resoles was determined, using a Sharples micromerigraph. (A micromerigraph is an instrument that is used to measure the particle size distribution in the 1 to 100 micron range by a sedimentation technique.) The particulate resoles were made by the technique of Example 3, using the standard formulation. The particulate resoles of this invention were compared with a commercial pulverized one-step/two-step phenolic resin. The results are displayed below in Table XI:

TABLE XI

| | Particle Size Distribution | | | |
|---|---|---|---|---|
| Diameter, Microns | 1 part gum arabic | 2 parts hydroxypropyl guar gum | 0.5 part PVAᵃ | Commercial Resin |
| <100 | 92% | 96% | 96% | 100% |
| <50 | 80 | 93 | 92 | 100 |
| <30 | 60 | 69 | 74 | 92 |
| <20 | 48 | 50 | 55 | 64 |
| <15 | 32 | 36 | 38 | 40 |
| <10 | 14 | 18 | 18 | 12 |
| <5 | 3 | 4 | 2 | 4 |
| Average Diameter, Microns | 21 | 20 | 18 | 18 |

ᵃ·Polyvinyl alcohol, 88 percent hydrolyzed, 10,000 molecular weight

EXAMPLE 9

RESORCINOL-BASED PARTICULATE RESOLE

Because of the position of its hydroxyl groups, resorcinol is an especially reactive phenol. The successful preparation of a resorcinol/formalin/hexa resole and its isolation as a particulate solid is evidence for the excellent product control inherent in the Particulate Resole process. The following charge was placed in a 1000-ml flask:

| 200 | grams | Resorcinol |
|---|---|---|
| 200 | | Formalin (40% aqueous CH₂O) |
| 20 | | Hexa |
| 2 | | Gum Arabic |
| 146 | | Water |

The resorcinol was predissolved in the water and the other reactants added. An exotherm carried the temperature to 55° C. Five minutes later, at 60° C., the bath clouded. Checking the dispersion on the 150° C. hotplate it was noted that the gel time was already very short. The batch, therefore, was cooled, poured into 1000 grams of water, filtered and dried at ambient temperature. The dry product was a fine red-brown powder. When tested on the 150° C. hotplate, the powder fused and then very quickly set to a film which had no flow; gelation was too rapid to estimate a gel time. As in the case of conventional phenolics, resorcinol would find practical utility as a minor modifier for a phenol-based Particulate Resole.

EXAMPLE 10

THE USE OF PARAFORM AS A SOURCE OF FORMALDEHYDE IN THE PREPARATION OF OUR STANDARD PARTICULATE RESOLE

The following were weighed into a 1000-ml 3-neck creased flask:

| 200 | grams | Phenol |
|---|---|---|
| 80 | | Paraform (90% CH₂O) |
| 18 | | Hexa |
| 2 | | Gum Arabic |
| 284 | | Water |

The batch was heated to 85° C.; a clear solution formed at 75° C. Nine minutes after reaching 85° C., the batch clouded as the insoluble resin stage was reached. After an hour at 85° C., a gel time of 127 seconds on the 150° C. hotplate was measured; a 97 second gel time was recorded at 85 minutes. At 87 minutes the reaction was stopped by cooling to 30° C. These gel time data indicate that the reaction was slightly slower than when aqueous formalin is used; it was assumed that the extra time was required to hydrolyze the paraform to its reactive form of methylene glycol.

Work-up of the product was by our standard methods of diluting with 1000 grams of water, filtering, and drying. The dry powder showed a 150° C. hotplate gel time of 76 seconds and a 125° C. plate flow of 76 mm. The product appeared to be equivalent to that made from 40% formalin.

On the other hand, trioxane did not react with phenol plus hexa and gum arabic in an aqueous medium; it was concluded that the tri(oxymethylene) structure was too stable to yield formaldehyde under these reaction conditions. In another experiment, phenol, paraform and hexa were reacted at reflux in (95%) ethanol; reaction did not occur but at a very slow rate. In another variation, phenol, formalin and hexa were reacted in acetone as the solvent; actually, the reactions medium was a mixture of acetone and water. Again, a very slow rate was noted. It was concluded that the aqueous medium of the Particulate Resole process plays a very specific role in the fast reaction rates found in this process.

EXAMPLE 11

HEXA VERSUS FIXED ALKALI CATALYSTS

The hexa in our standard Particulate Resole formula serves two purposes, acting as a catalyst to speed up the resin-forming reaction and as a modifier of the product made, insuring filterability from the aqueous medium and also playing a role in the sinter resistance of the dry powder. The latter effect is thought to be the result of a lesser tendency of hexa-modified phenolics to absorb atmospheric moisture, thereby aiding sintering.

In spite of the fact that hexa must be a very weak base, hexa has been shown to produce a resole resin at a much more rapid rate than the strong base NaOH. The following experiment (using the standard procedure) established the equivalency of hexa and aqueous ammonia plus formalin:

| 200 | grams | Phenol |
|---|---|---|
| 240 | | Formalin (40% CH₂O) |
| 30 | | 29% NH₃ (aq.) |
| 220 | | Water |

| 2 | | Gum Arabic |
|---|---|---|

After 80 minutes at 85° C., a 75-second gel time (150° C. hotplate) was found; work-up gave a product indistinguishable from that made with hexa.

In the following experiment, the above formula was used again except that the ammonia was replaced with enough NaOH to ionize 5% of the phenol and to raise the pH to about 8 (compared to 7.2 with ammonia or hexa):

| 200 | grams | Phenol |
|---|---|---|
| 240 | | Formalin |
| 8 | | 25% NaOH (aq.) |
| 260 | | Water |
| 20 | | Vinol 205 |

This batch was also held at 85° C., and sampled for the hotplate gel test:

| At 1.0 hour | 186 secs. | at 150° C. |
|---|---|---|
| 1.5 hour | 158 secs. | at 150° C. |
| 2.0 hour | 144 secs. | at 150° C. |
| 2.5 hour | 129 secs. | at 150° C. |
| 3.0 hour | 125 secs. | at 150° C. |
| 3.5 hour | 111 secs. | at 150° C. |
| 3.75 hour | 90 secs. | at 150° C. |
| 4.0 hour | 72 secs. | at 150° C. |

Also, in contrast to the ammonia/hexa catalysis, precipitation first occurred at 3.5 hours (instead of <5 minutes). After this 4-hour reaction, the dispersion was acidified to a pH of 5.8 with dilute phosphoric acid; acidification resulted in breaking of the dispersion, so that the product was in the form of a soft lump of resin, rather than a particulate solid.

In another experiment, barium hydroxide was employed with polyvinyl alcohol substituted for gum arabic:

| 200 | grams | Phenol |
|---|---|---|
| 222 | | Formalin (40%) |
| 5 | | Barium Hydroxide Monohydrate |
| 20 | | Gelvatol 20-30 |
| 132 | | Water |

The phenol, formalin, and barium catalyst were held at reflux for 30 minutes, after which the colloid and water was added. After acidification with dilute $H_2SO_4$ to a pH of 5.0–5.5, the batch was held at 85° C. for a 150° C. hotplate gel time of 90–100 seconds. This required 3.3 hours. After cooling to 25° C. and stopping the stirring, the "emulsion" separated into two phases, a resinous and an aqueous phase. Thus, the PVA is not a suitable protective colloid for the dispersion which, instead, uses 2 parts gum arabic (per 100 parts phenol) plus 0.5 part guar gum (a thickener), as is taught in the Harding patent, U.S. Pat. No. 3,823,103. On the other hand, fine particle size emulsions have been made with 5 or more parts of polyvinyl alcohol when the resole formula contained hexa as modifier/catalyst. The latter is illustrated by the following experiment:

| 200 | grams | Phenol |
|---|---|---|
| 180 | | Formalin (40% $CH_2O$) |
| 18 | | Hexa |
| 20 | | Vinol 205 |
| 184 | | Water |

A 70-minute reaction at 85° C. was sufficient to reach a 71-second gel time. That this amount of PVA had produced a very fine dispersion was evident from the intense whiteness of the emulsion, from complete inability to filter the solid product, from a very limited amount of settling during a centrifugation attempt and from inspection under the microscope. The latter showed the largest particle size to be about 2 microns in diameter, with the bulk of the product at 1 micron or less.

In another experiment NaOH was added to the standard formulation:

| 200 | grams | Phenol |
|---|---|---|
| 180 | | Formalin (40%) |
| 8 | | 25% NaOH (aq.) |
| 18 | | Hexa |
| 2 | | Gum Arabic |
| 184 | | Water |

When the above reactants were held at 85° C., a cloud was noted only after 40 minutes; this did not develop into the normal precipitation of a water-insoluble product even though held for another hour at 85° C. Gel Times also fell at a very slow rate. Acidification of the NaOH to a pH of 7 resulted in the separation of two liquid layers. Thus, the addition of NaOH to the standard formula inhibited the resin-forming reaction; this behavior has not been explained.

SINTERING AND A METHOD OF TESTING

There is no advantage to a particulate solid if this particulate nature is not maintained on storage. Thus, although a conventional phenolic resole can be ground to a pulverized resin, such a material is not offered commercially because the ground resin will maintain its particulate form at ambient temperature for only a limited period of time. The process by which a powder fuses to a larger mass, thereby losing its particulate nature, is known as sintering.

Conventional phenolic resoles are amorphous solids that have softening temperatures a bit above room temperature. More precisely, these resins have glass transition temperatures in the neighborhood of 30° C. The Particulate Resoles of this invention have shown glass transition temperatures as high as 42° C. when thoroughly dry. These resins have been found to resist sintering even at 40°–45° C. Furthermore, the Particulate Resoles of this invention have been dried at 60° C. in a fluidized bed drier (that is, at zero-gravity conditions) with no apparent loss of their particulate character. This "extra" protection has been ascribed to the colloid used in the resin manufacture. It has also been shown that incomplete drying of the Particulate Resole will lower the glass transition temperature and adversely affect resistance to sintering. We believe that the water content, as measured by Karl Fischer analysis, of the dry resins should be kept at 1.0% maximum and preferably at 0.5% maximum.

We have devised an Accelerated Sinter Test for the Particulate Resoles which employs a test tube having an inside diameter of 23 mm and a cylindrical brass insert having a diameter of 21 mm and weighing 160 grams. A 2 to 3 centimeter height of powder is poured into the test tube, the weight inserted, and the assembly placed in a 40° C. or a 32° C. oven in an upright position, usually overnight. (These dimensions and weight translate to a force of 100 pounds per square foot or approximately the weight of a stack of four bags of resin.) On removal from the test the resin powder is examined and one of three classifications selected:

Sinter-Resistant—Tapping the test tube is sufficient to restore the free-flowing character of the dry powder.

Slight Sintering—A very light crust just below the weight is easily broken, exposing the original free-flowing powder.

Sintered—Some degree of fusion has occurred so that the material no longer possesses its particulate nature; this can range from fusion between the spherical particles to a complete loss of the individual particles. The above sinter test is an accelerated test in the sense that products failing the test at 40° C. or at 32° C. might pass the test if run at a lower temperature; conversely, all materials passing the accelerated test would also pass at a lower temperature, making the sinter test more conservative. As used herein, the term sinter-resistant refers to a particulate phenolic resin that passes the above-described acclerated sintering test run t 32° C.

As noted above the tendency to sinter is a function of the magnitude of the difference between the test temperature and the glass transition temperature. Also a function of this same temperature difference is the ageing tendency of the resin, as measured by the hotplate gel time test. For this reason, although a Particulate Resole might pass the accelerated 40° C. sinter test, the resin should not be stored at this high a temperature except for a very brief time.

A series of Particulate Resoles of the invention were subjected to the accelerated sintering test described above. They were all made by procedures analogous to those described in the Examples above. The formulations, 125° C. plate flows, 150° C. gel times, and results of the sintering tests are displayed below in Table XII.

Although certain processing parameters, such as reaction time, can be manipulated to increase plate flow, greater flow has been accompanied by loss of sinter resistance, a valued property of the Particulate Resoles. It has been found that both increased flow and sinter resistance may be obtained if a small fraction—2 to 25% by weight (preferably 5 to 10%)—of trifunctional or tetrafunctional phenol is replaced with a less functional phenol, that is an ortho- or para-substituted phenol. Some examples of suitable, commercially available difunctional phenols are:

p-Cresol 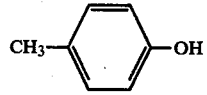

o-Cresol 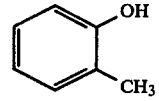

p-tertiary-Butylphenol 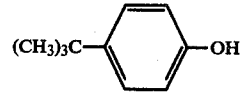

p-Phenylphenol 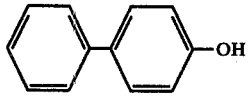

p-Cumylphenol 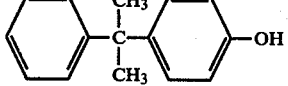

p-Nonylphenol 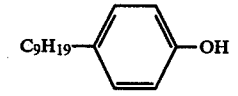

p-Octylphenol 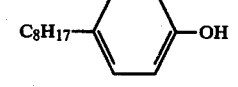

p-Dodecylphenol 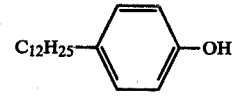

TABLE XII

SINTER TEST RESULTS

| | Formulation, Parts by Weight | | | | 125° C. Plate Flow, mm. | 150° C. Gel Time, sec. | Sinter Test | |
|---|---|---|---|---|---|---|---|---|
| Run No. | Phenol[a] | Formalin | Hexa | Colloid[b] | | | 40° C. | 32° C. |
| Control[c] | — | — | — | — | 56 | 58 | Failed | Failed |
| 1 | 100P | 90 | 9 | 1 | 58 | 90 | Failed | Passed |
| 2 | 90P | 90 | 9 | 1 | 58 | 75 | Sl.Sint. | Passed |
| 3 | 80P | 90 | 9 | 1 | 40 | 80 | Sl.Sint. | Passed |
| 4 | 20B/80P | 90 | 9 | 1 | 62 | 80 | Failed | Passed |
| 5 | 100P | 96 | 7 | 1 | 47 | 72 | Failed | Passed |
| 6 | 80P 20T | 90 | 9 | 1 | 133 | 101 | Failed | Passed |
| 7 | 100P | 80 | 9 | 1 | 69 | 80 | Sl.Sint. | Passed |
| 8 | 80P 20T | 90 | 9 | 1 | 64 | 78 | Failed | Passed |
| 9 | 100P | 90 | 9 | .75 | 90 | 84 | — | Passed |
| 10 | 100P | 90 | 9 | .75 | 115 | 79 | — | Passed |
| 11 | 100P | 90 | 9 | 1 | 40 | 77 | Passed | — |
| 12 | 100P | 90 | 9 | 1 | 52 | 90 | Passed | — |
| 13 | 100P | 90 | 9 | 1 | 19 | 55 | Passed | — |

[a]P=phenol; B=bisphenol-A; T=p-t-butyl phenol
[b]VINOL 205, except Run No. 11, which was gum arabic
[c]Commercial Pulverized one-step, two-step phenolic resin The Particulate Resoles of this invention have been noted to possess plate flow values which are somewhat lower than might be required for specific applications.

Styrylphenol

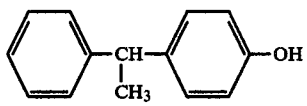

Some Examples of monofunctional phenols include:

2,4-Xylenol

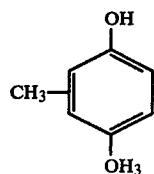

2,6-Xylenol

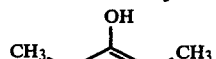

2,6-Di-t-butylphenol

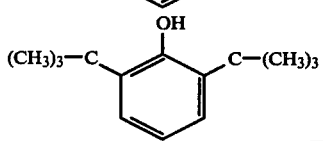

2,4-Di-t-butylphenol (CH₃)₃—C—[OH-phenyl]—C(CH₃)₃

Table XIII summarizes the results found when 2,5 or 10 weight % para-tertiary-butylphenol was incorporated into a Particulate Resole. Up to a 7-fold increase in plate flow was realized, sinter resistance on storage was retained, but the average particle size was increased to an undesirable level. The latter was eliminated when a large amount of water was omitted from the formulation, raising the dispersion "solids" during reaction from 41% to 52%, 60% or 66%. The higher reaction solids is of interest not only to control flow but also because of the potential increase in still productivity (as high as 60%) and its favorable effect on economics. This formulation change, therefore, has also been extended to short-flow as well as long-flow Particulate Resoles.

Table XIV summarizes the result of a series of three preparations of short-flow Particulate Resole made at a calculated 66% concentration of resin product and of three preparations of long-flow Particulate Resole, together with characterization data. The data shown are the averages of each set of three runs plus the calculated standard deviations.

Table XV is similar to Table XIV except that the condensations were carried out at 52% solids.

As noted above, ortho- and para-alkyl- or aryl-substituted phenols may be used to realize higher flow Particulate Resoles. The examples given in Tables XIII, XIV and XV were limited to para-tertiary-butylphenol because of its ease of handling, ready availability and high purity. Cresols were also tested experimentally. These cresols included a pure ortho-cresol and an industrial grade cresol which is a blend consisting of about 45% meta-cresol plus phenol (that is, the trifunctional fraction) and about 55% ortho- and para-cresol (the difunctional fraction).

EXAMPLE 12

| | | |
|---|---|---|
| 190.0 | grams | Phenol |
| 10.0 | | Cresol Blend |
| 180.0 | | 40% Formalin |
| 18.0 | | Hexamethylenetetramine |
| 3.0 | | Vinol 205 |
| 184.0 | | Water |

TABLE XIII
PARA-TERTIARY-BUTYLPHENOL AS A PARTICULATE RESOLE MODIFIER

| RUN NO. | RATIO OF PHENOL:p-t-BUTYLPHENOL | REACTION TIME | 150° GEL | 125° P.F. | H₂O | PHENOL | $\overline{An}$ | $\overline{Aw}$ | $\overline{Aw}/\overline{An}$ | SIZE |
|---|---|---|---|---|---|---|---|---|---|---|
| 1 | 90/10 | 80 min. | 85 sec. | 132 mm. | 1.29% | 6.0% | 40.3 | 76.6 | 1.90 | coarse |
| 2 | 90/10 | 90 | 69 | 79 | 0.54 | 5.5 | 42.4 | 86.6 | 2.04 | coarse |
| 3 | 95/5 | 80 | 65 | 86 | 2.0 | 5.6 | 43.1 | 87.8 | 2.04 | coarse |
| 4 | 95/5 | 80 | 68 | 81 | 1.14 | 5.5 | 44.4 | 89.6 | 2.02 | coarse |
| 5 | 98/2 | 80 | 67 | 65 | — | — | — | — | — | fine + coarse |
| 6 | 100/0 | 80 | 53 | 18 | 0.71 | 5.4 | 43.2 | 87.9 | 2.04 | fine |

TABLE XIV
SHORT AND LONG FLOW PARTICULATE RESOLE AT 66% SOLIDS:FORMULAS AND CHARACTERIZATION DATA

| PRODUCT TYPE | SHORT FLOW | | LONG FLOW | |
|---|---|---|---|---|
| Formula | | | | |
| Phenol | 100. | Parts | 95. | Parts |
| t-Butylphenol | — | | 5.0 | " |
| 50% Formalin | 72. | " | 72. | " |
| Hexa | 9.0 | " | 9.0 | " |
| VINOL 205 | 1.0 | " | 1.0 | " |
| Reaction Cycle | 85° C./65 Minutes | | 85° C./65 Minutes | |
| Characterization | | | | |
| 150° C. Gel Time | 71 ± 11 sec | | 105 ± 6 sec | |
| 125° C. Plate Flow | 44 ± 8 mm | | 88 ± 10 mm | |
| Moisture Content | 0.33 ± 0.12% | | 0.0 ± % | |
| Free Phenol | 5.4 ± 0.1% | | 5.5 ± 0.2% | |
| $\overline{An}$ | 42.2 ± 1.5 | | 39.7 ± 0.7 | |
| $\overline{Aw}$ | 87.3 ± 5.7 | | 75.8 ± 3.0 | |
| $\overline{Aw}/\overline{An}$ | 2.07 ± 0.06 | | 1.91 ± 0.04 | |
| Sinter Test at 35° C. | Passes | | Passes | |

TABLE XV
LONG AND SHORT FLOW PARTICULATE RESOLE AT 52% SOLIDS:FORMULAS AND CHARACTERIZATION DATA

| PRODUCT TYPE | SHORT-FLOW | | LONG FLOW | |
|---|---|---|---|---|
| Formula | | | | |
| Phenol | 100. | Parts | 95. | Parts |
| t-Butylphenol | — | | 5.0 | " |
| 40% Formalin | 90 | " | 90. | " |

TABLE XV-continued

LONG AND SHORT FLOW PARTICULATE RESOLE AT 52% SOLIDS:FORMULAS AND CHARACTERIZATION DATA

| PRODUCT TYPE | SHORT-FLOW | LONG FLOW |
|---|---|---|
| Hexa | 9.0 " | 9.0 " |
| VINOL 205 | 1.0 " | 1.0 " |
| Water | 30.0 " | 30.0 " |
| Reaction Cycle | 85° C./65 Minutes | 85° C./65 Minutes |
| Characterization | | |
| 150° C. Gel Time | 65 ± 2 sec | 88 ± 1 sec |
| 125° C. Plate Flow | 40 ± 8 mm | 98 ± 4 mm |
| Moisture Content | 0.0 ± % | 0.33 ± 0.32% |
| Free Phenol | 6.1 ± 0.4% | 6.4 ± 0.2% |
| An | 40.9 ± 0.6 | 39.1 ± 0.2 |
| Aw | 84.0 ± 2.4 | 77.8 ± 3.3 |
| Aw/An | 2.05 ± 0.04 | 1.97 ± 0.05 |
| Glass Trans. Temp. | 40° ± 3° C. | 37° ± 3° C. |
| Sinter Test at 35° C. | Passes | Passes |

The above charge in a 1-liter flask was heated to 85° and held for 80 minutes past the cloud point. The product was worked up by cooling, diluting with 1000 grams of water, filtering and drying. Measured: 22 mm plate flow, 43 sec gel time at 150° C. The increase in flow is low because of the 45% trifunctional content of the cresol blend.

EXAMPLE 13

In the next preparation, the cresol blend was doubled in the charge shown below:

| 180.0 g. | Phenol |
|---|---|
| 20.0 g. | Cresol Blend |
| 180.0 g. | 40% Formalin |
| 18.0 g. | Hexamethylenetetramine |
| 2.0 g. | Vinol 205 |
| 184.0 g. | Water |

The batch was held at 85° C. for 80 minutes after the cloud point. It was then cooled, water-washed, filtered and dried. Plate flow was 88 mm and gel time at 150° C. was 68 sec.

EXAMPLE 14

A highly purified ortho-cresol was obtained from the Aldrich Chemical Company was used in the charge below:

| 190.0 g. | Phenol |
|---|---|
| 10.0 g. | o-Cresol |
| 180.0 g. | 40% Formalin |
| 18.0 g. | Hexamethylenetetramine |
| 2.0 g. | Vinol 205 |
| 184.0 g. | Water |

After an 80-minute reaction and work-up in the standardized manner, the product showed a plate flow of 63 mm and a gel time of 65 sec.

EXAMPLE 15

| 291.0 g. | Phenol |
|---|---|
| 9.0 g. | 2,6-di-t-Butylphenol |
| 216.0 g. | 50% Formalin |
| 27.0 g. | Hexamethylenetetramine |
| 3.0 g. | Vinol 205 |

The above charge in a 1-liter flask was heated to 85° C. and held at 85° C. for 65 minutes beyond the cloud point. The product was washed up by cooling and diluting with 1500 grams of water. The product was filtered and dried. The measured plate flow was 120 mm. and the gel time at 150° C. was 83 seconds. The product passed the sinter test at 36° C.

Although the invention has been described with a certain degree of particularity, it is understood that the present disclosure of the preferred forms has been made only by way of example and that numerous changes may be resorted to without departing from the spirit and scope of the invention.

What is claimed is:

1. A process for producing a particulate solid, heat-reactive, substantially water-insoluble resole, which process comprises the steps of:
    (a) reacting formaldehyde, a phenol that is a trifunctional or tetrafunctional phenol or mixtures thereof, and an effective amount of an amine compound selected from the group consisting of hexamethylenetetramine, a compound containing amino hydrogen, and mixtures thereof, in an aqueous medium in the presence of an effective amount of a protective colloid that exhibits protective colloid properties, at a temperature within the range of from about 70° C. to about 100° C., for a period of time sufficient to produce a particulate solid, heat-reactive, substantially water-insoluble, thermosetting resole that is dispersed in said aqueous medium but is separable therefrom in particulate form at the completion of the reaction whereupon the reaction mixture is cooled to a temperature below about 40° C.; and
    (b) recovering said resole from said aqueous dispersion.

2. The process of claim 1 wherein the amine compound is hexamethylenetetramine or ammonia.

3. The process of claim 1 wherein the phenol is monohydroxybenzene, 2,2-bis(4-hydroxyphenyl)-propane, m-cresol, resorcinol, or mixtures thereof.

4. The process of claim 1 wherein the phenol is monohydroxybenzene, 2,2-bis(4-hydroxyphenyl)-propane, or a mixture thereof.

5. The process of claim 2 wherein the phenol is monohydroxybenzene, 2,2-bis(4-hydroxyphenyl)-propane, or a mixture thereof.

6. The process of claim 1 wherein the protective colloid is gum arabic, gum ghatti, hydroxyalkyl guar gum, or partially hydrolyzed polyvinyl alcohol.

7. The process of claim 2 wherein the protective colloid is gum arabic, gum ghatti, hydroxyalkyl guar gum, or partially hydrolyzed polyvinyl alcohol.

8. The process of claim 4 wherein the protective colloid is gum arabic, gum ghatti, hydroxyalkyl guar gum, or partially hydrolyzed polyvinyl alcohol.

9. The process of claim 5 wherein the protective colloid is gum arabic, gum ghatti, hydroxyalkyl guar gum, or partially hydrolyzed polyvinyl alcohol.

10. The process of claim 1 wherein the reaction in step (a) is carried out at a temperature within the range of from about 75° to about 90° C.

11. The process of claim 2 wherein the reaction in step (a) is carried out at a temperature within the range of from about 75° to about 90° C.

12. The process of claim 5 wherein the reaction in step (a) is carried out at a temperature within the range of from about 75° to about 90° C.

13. The process of claim 7 wherein the reaction in step (a) is carried out at a temperature within the range of from about 75° to about 90° C.

14. The process of claim 9 wherein the reaction in step (a) is carried out at a temperature within the range of from about 75° to about 90° C.

15. A sinter-resistant, particulate solid, heat-reactive, substantially water-insoluble resole, which consists essentially of the product of the process of claim 1.

16. The resole of claim 15, wherein said resole consists essentially of the product of the process of claim 2.

17. The resole of claim 15, wherein said resole consists essentially of the product of the process of claim 3.

18. The resole of claim 15, wherein said resole consists essentially of the product of the process of claim 4.

19. The resole of claim 15, wherein said resole consists essentially of the product of the process of claim 5.

20. The resole of claim 15, wherein said resole consists essentially of the product of the process of claim 6.

21. The resole of claim 15, wherein said resole consists essentially of the product of the process of claim 10.

22. The process of claim 1 wherein the phenol is a mixture of a trifunctional or tetrafunctional phenol and less than about 50 mole % of a difunctional or monofunctional phenol.

23. The process of claim 22 wherein the trifunctional phenol is monohydroxybenzene and the difunctional phenol is p-t-butylphenol.

24. The process of claim 22 wherein the trifunctional phenol is monohydroxybenzene and the difunctional phenol is para-or ortho-cresol.

25. The process of claim 22 wherein the tetrafunctional phenol is 2,2-bis(4-hydroxyphenyl) propane.

26. The process of claim 1 wherein the aqueous dispersion contains about 30 to about 50% by weight of water.

27. The process of claim 2 wherein the phenol is monohydroxybenzene and wherein about 6 parts by weight of hexamethylenetetramine per 100 parts by weight of phenol or ammonia in an amount having the equivalent quantity of nitrogen is used.

28. The process of claim 2 wherein the phenol is 2,2-bis(4-hydroxyphenyl)-propane and wherein at least about 3 parts by weight of hexamethylenetetramine per 100 parts by weight of phenol or ammonia in an amount having the equivalent quantity of nitrogen is used.

29. The process of claim 1 wherein the protective colloid is used in an amount of at least about 0.1 weight percent based on weight of phenol.

30. The process of claim 29 wherein the protective colloid is used in an amount from about 0.5 weight percent to about 2 weight percent based on weight of phenol.

31. A sinter-resistant, particulate solid, heat-reactive, substantially water-insoluble resole prepared from a trifunctional phenol selected from the group consisting of monohydroxybenzene, m-cresol, and resorcinol that does not sinter on aging for at least 12 hours under a force of 100 pounds per square foot at 32° C. and has a plate flow at 125° C. of at least about 18 mm.

32. The resole of claim 31 having a gel time of at least 40 seconds at 150° C.

33. The resole of claim 31 wherein said resole is in the "A" stage state.

34. The resole of claim 31 wherein said phenol is monohydroxybenzene.

35. The resole of claim 31 wherein said phenol is a mixture of a trifunctional phenol and less than about 50 mole percent of a difunctional or monofunctional phenol.

* * * * *

REEXAMINATION CERTIFICATE (264th)

United States Patent [19]

Wynstra et al.

[11] B1 4,206,095

[45] Certificate Issued Oct. 23, 1984

[54] PROCESS FOR PRODUCING PARTICULATE RESOLES FROM AQUEOUS DISPERSION

[75] Inventors: John Wynstra, Somerville; Sidney J. Schultz, Cranford, both of N.J.

[73] Assignee: Union Carbide Corporation, New York, N.Y.

Reexamination Request:
No. 90/000,321, Jan. 24, 1983

Reexamination Certificate for:
Patent No.: 4,206,095
Issued: Jun. 3, 1980
Appl. No.: 971,960
Filed: Dec. 21, 1978

Related U.S. Application Data

[63] Continuation of Ser. No. 776,881, Mar. 14, 1977, abandoned, which is a continuation-in-part of Ser. No. 672,075, Mar. 30, 1976, abandoned.

[51] Int. Cl.$^3$ .......................... C08L 1/28; C08L 5/00
[52] U.S. Cl. .................................. 528/137; 528/129; 524/55; 524/732
[58] Field of Search .................. 524/732, 55; 528/129, 528/137

[56] References Cited

U.S. PATENT DOCUMENTS

| | | | |
|---|---|---|---|
| 3,823,103 | 7/1974 | Harding | 524/28 |
| 4,026,848 | 5/1977 | Harding et al. | 524/28 |
| 4,071,481 | 1/1978 | Hanton | 521/60 |

FOREIGN PATENT DOCUMENTS

| | | |
|---|---|---|
| 2409988 | 3/1974 | Fed. Rep. of Germany . |
| 1347878 | 2/1974 | United Kingdom . |

OTHER PUBLICATIONS

Emulsion and Water-Soluble Paints and Coatings, by Charles R. Martens, Reinhold Publishing Corp., Chapman & Hall, Ltd., London, pp. 58–66.

*Primary Examiner*—John Kight, III
*Assistant Examiner*—Nathan M. Nutter

[57] ABSTRACT

Particulate resoles are produced by reacting a phenol, formaldehyde, and an amine in an aqueous medium containing a protective colloid, to produce an aqueous suspension of a particulate resole, and recovering the particulate resole from said suspension.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 16 lines 3–38:

TABLE IX
THE EFFECT OF FORMALIN FACTOR

| Sample | FORM[a] FACT. | FORMULA WEIGHTS USED[b] | | | | | PRODUCT YIELD | 150° C. GEL | 125° C. PLATE FLOW mm. |
| --- | --- | --- | --- | --- | --- | --- | --- | --- | --- |
| | | PHENOL | 40% $CH_2O$ | HEXA | $H_2O$ | G.A.[d] | | | |
| 1 | 70 | 200 | 140 | 18 | 292 | 2.0 | 220 | 89 | 100 |
| 2 | 90 | 200 | 180 | 18 | 292 | 2.0 | 222 | 81 | 74 |
| 3 | 110 | 200 | 220 | 18 | 292 | 2.0 | 225 | 72 | 62 |
| 4 | 120 | 200 | 240 | 24 | 292 | 2.0 | 240 | 78 | 49 |
| 5[c] | 110 | 200 | 220 | 18 | 292 | 2.0 | 230 | 65 | — |
| 6[c] | 110 | 200 | 220 | 18 | (c) | 2.0 | 254 | 58 | — |

NOTES:
[a]Formaldehyde factor, parts of 40% $CH_2O$ per 100 parts phenol.
[b]All reactions carried out in one-liter flasks.
[c]In this pair of experiments the first wash (2470 grams) of Exp. 5 was concentrated to 330 grams by boiling off water. The concentrate was substituted for make-up water of Exp. 6.
[d]Gum arabic.

Column 12 lines 13–27:

TABLE IV
PROTECTIVE COLLOIDS SHOWING EXCELLENT PERFORMANCE IN PARTICULATE RESOLE PREPARATION[a]

| Sample | Protective Colloid[b] | Gel Time | Plate Flow | Other Observations |
| --- | --- | --- | --- | --- |
| 1 | Gum Arabic (1 Part) | 77 sec. | 40[min.]*mm.* | Range of particle sizes, very free-flowing |
| 2 | Gum Ghatti (1 Part) | 79 | 0 | Small particle sizes, very free-flowing |
| 3 | ELVANOL 51-05 | 78 | 44 | Small particle size, very free-flowing |
| 4 | JAGUAR HP-1 | 80 | 0 | Small particle size, very free-flowing |

NOTES:
[a]Standard formulation and process. Protective colloids at 2 parts per 100 phenol (by weight), except as indicated.
[b]Identity of materials:
Gum Arabic - Polysaccharide of natural origin, imported from Africa.
Gum Ghatti - Polysaccharide of natural origin, imported from India.
ELVANOL 51-05 Polyvinyl alcohol, 88% hydrolized, low molecular weight (about 10,000)
JAGUAR HP-1 Hydroxypropylated guar gum containing about 15 weight percent propylene oxide units.

Column 12 lines 27–48:

TABLE V
PROTECTIVE COLLOIDS SHOWING PROMISE IN PARTICULATE RESOLES

| Sample | Protective Colloid[a] | Gel Time[b] | Plate Flow[b] | Other Observations |
| --- | --- | --- | --- | --- |
| 5 | Cellosize WP-09 | 77 sec. | 73[min.]*mm.* | The best results of this group |
| 6 | CMC | — | — | Sintered on standing overnight |
| 7 | Soluble Starch | — | — | Sintered overnight |
| 8 | Agar | — | — | Sintered overnight |

NOTES:
[a]Identity of protective colloids:
CELLOSIZE WP-09 - low molecular weight hydroxyethyl cellulose (UCC).
CMC - carboxymethyl cellulose (Hercules).
Soluble Starch - (Merck reagent grade).
Agar - polysaccharide derived from seaweed (MC&B).
[b]All four products handled well during the condensation, on cooling and diluting, and during filtration and drying. On standing however, all sintered, #5 slowly over a period of several weeks and #6, 7 and 8 on standing overnight.

AS A RESULT OF REEXAMINATION, IT HAS BEEN DETERMINED THAT:

The patentability of claims 31–35 is confirmed.

Claims 2, 5–9, 11, 13, 14, 16, 19 and 20 are cancelled.

Claims 1, 12, 27 and 28 are determined to be patentable as amended:

Claims 3, 4, 10, 15, 17, 18, 21–26, 29 and 30, dependent on an amended claim, are determined to be patentable.

1. A process for producing a particulate solid, heat-reactive, substantially water-insoluble resole *having a maximum particle size of about 500 microns, a plate flow at 125° C. of at least about 18 mm., and that does not sinter on aging for at least 12 hours under a force of 100* pounds per square foot at 32° C., which process [comprises] *consists essentially of* the steps of:

(a) reacting formaldehyde, a phenol that is a trifunctional or tetrafunctional phenol or mixtures thereof, and an effective amount of an amine compound selected *solely* from the group consisting of hexamethylenetetramine, [a compound containing amino hydrogen,] *ammonia*, and mixtures thereof, in an aqueous medium in the presence of an effective amount of a protective colloid that exhibits protective colloid properties, *and is selected from the group consisting of gum arabic, and partially hydrolyzed polyvinyl alcohol*, at a temperature within the range of from about 70° C. to about 100° C., for a period of time sufficient to produce a particulate solid, heat-reactive, substantially water-insoluble, thermosetting resole that is dispersed in said aqueous medium but is separable therefrom in particulate form at the completion of the reaction whereupon the reaction mixture is cooled to a temperature below about 40° C.; and (b) recovering said resole from said aqueous dispersion.

12. The process of claim [5] *1* wherein the reaction in step (a) is carried out at a temperature within the range of from about 75° to about 90° C.

27. The process of claim [2] *1* wherein the phenol is monohydroxybenzene and wherein about 6 parts by weight of hexamethylenetetramine per 100 parts by weight of phenol or ammonia in an amount having the equivalent quantity of nitrogen is used.

28. The process of claim [2] *1* wherein the phenol is 2,2-bis(4-hydroxyphenyl)-propane and wherein at least about 3 parts by weight of hexamethylenetetramine per 100 parts by weight of phenol or ammonia in an amount having the equivalent quantity of nitrogen is used.

* * * * *